R. BUSH.
Rotary-Pump.
No. 224,870. Patented Feb. 24, 1880.
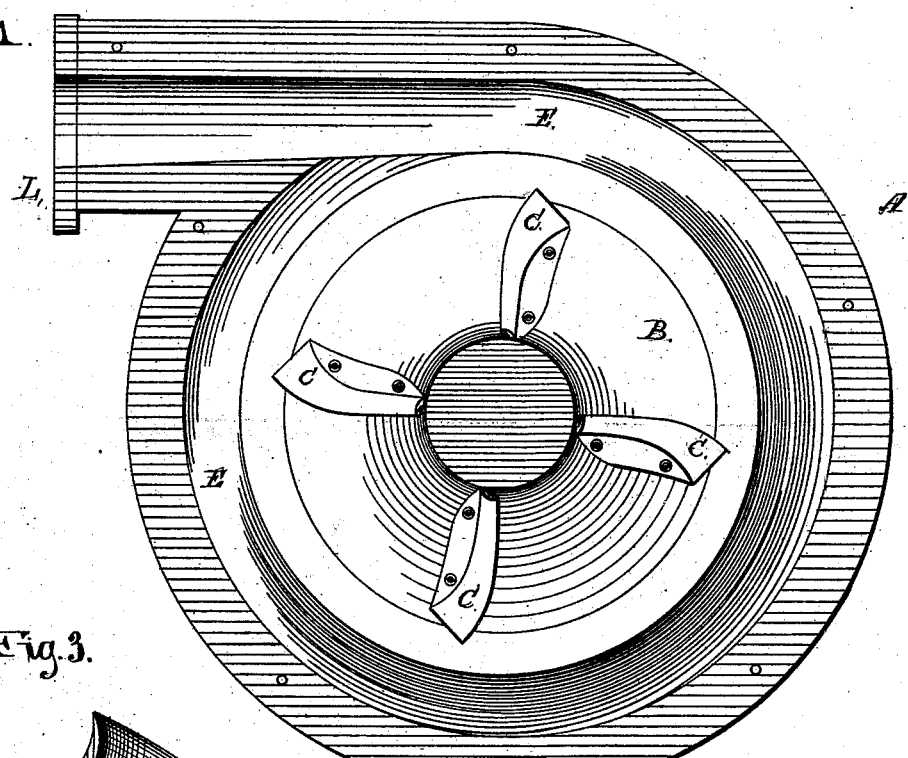
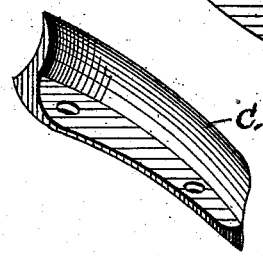
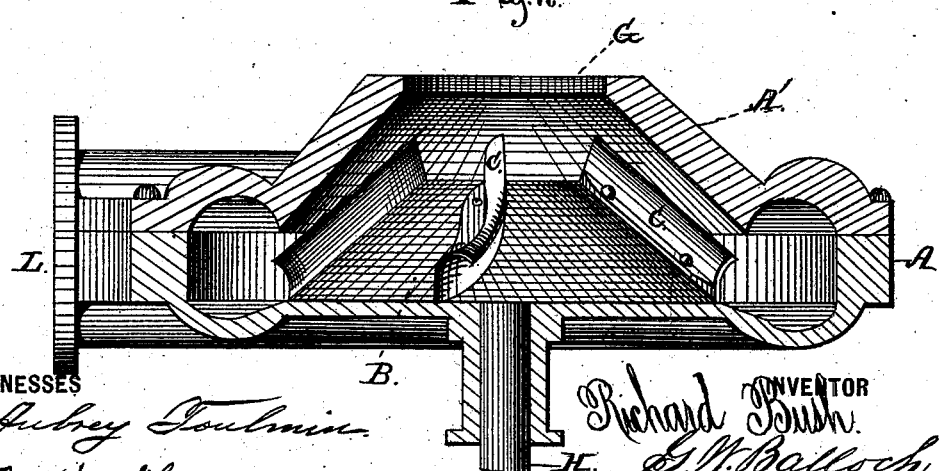
WITNESSES
INVENTOR
ATTORNEYS

UNITED STATES PATENT OFFICE.

RICHARD BUSH, OF BROOKLYN, NEW YORK.

ROTARY PUMP.

SPECIFICATION forming part of Letters Patent No. 224,870, dated February 24, 1880.

Application filed November 26, 1879.

*To all whom it may concern:*

Be it known that I, RICHARD BUSH, of the city of Brooklyn, in the county of Kings and State of New York, have invented a new and useful Improvement in Rotary Pumps, of which the following is a specification.

My invention consists of a concave wing whose concavity increases from induction end to discharge end, and whose discharge end recedes or falls back, thereby retaining wing-surface, increasing discharge-opening, and permitting free passage of coal, stones, &c.

The object of my invention is to provide a centrifugal pump which will permit the passage of large ingredients, such as coal, stones, or other heavy material, in large quantities, without the scouring or wearing away of the outer case or shell of the pump by the coarse material, and to make the wings or buckets in such shape and proportion as to permit the free passage of the coal, stones, &c., without injuring the wings or buckets.

In endeavoring to adapt my centrifugal pump, patented May 10, 1870, to the above-mentioned requirements, I found, by experimenting, that in order to prevent the coal, stones, &c., being jammed or caught on the points of the wings at the neck of the pump I must remove the point of the wing to give space for the material to pass. By simply shortening the wing I, of course, would reduce its area.

By continued experiment I finally hit upon the expedient of permitting the point of the wing to recede or drop back from a right line or disk, and by so doing I also retained the wing area. I also found by making the wing slightly concave at the root or induction end and increasing the concavity to a half-circle, or nearly so, at discharge end I prevented the scouring or rubbing of the coal, stones, &c., against the outer case or shell of the pump.

In the drawings, Figure 1 is a side elevation having the outer case, A', removed, in order to show the internal construction. Fig. 2 is a section through the case A and A', showing the shape of the wings C and the manner of attaching them to the cone B. Fig. 3 is a detailed view of one of the wings C.

The shaft H is to be mounted in any usual frame or bearings, and carries at one end the conical wheel of buckets, said wheel having the buckets C placed radially, as shown in Fig. 1.

The peculiar shape of the wings or buckets C is shown in Figs. 2 and 3.

The case containing the centrifugal wheel B is made of two parts, A' and A, bolted together, and said case is made with a water-way, E, gradually increasing in size and terminating in discharge-pipe L. The side of case A' is left open in the middle, as shown at G, Fig. 2.

I claim as my invention—

1. In a rotary pump, the concave wing or bucket C, whose concavity increases from induction end to discharge end, as described, and for the purposes set forth.

2. In a rotary pump, the concave wing or bucket C, whose concavity increases from induction end, and whose discharge end recedes or falls back, in the manner and for the purpose described.

RICHARD BUSH.

Witnesses:
WHITFIELD TERRIBERRY,
H. H. HADLEY.